US011617299B2

(12) United States Patent
Tison et al.

(10) Patent No.: US 11,617,299 B2
(45) Date of Patent: Apr. 4, 2023

(54) SYSTEM AND METHOD FOR REGULATING AND DISPENSING SEEDS, FERTILIZER, AND OTHER ITEMS

(71) Applicant: First Products, Inc., Tifton, GA (US)

(72) Inventors: Paul J. Tison, Warwick, GA (US); Donald C. Jones, Tifton, GA (US)

(73) Assignee: First Products, Inc., Tifton, GA (US)

( * ) Notice: Subject to any disclaimer, the term of this patent is extended or adjusted under 35 U.S.C. 154(b) by 323 days.

(21) Appl. No.: 16/848,278

(22) Filed: Apr. 14, 2020

(65) Prior Publication Data

US 2021/0315153 A1 Oct. 14, 2021

(51) Int. Cl.
*A01C 15/00* (2006.01)
*A01C 7/10* (2006.01)
*A01C 7/06* (2006.01)

(52) U.S. Cl.
CPC .............. *A01C 15/007* (2013.01); *A01C 7/06* (2013.01); *A01C 7/102* (2013.01)

(58) Field of Classification Search
CPC ......... A01C 15/007; A01C 7/06; A01C 7/102; A01C 15/006; A01C 15/005; A01C 15/00; A01C 7/00; A01C 7/10; A01C 7/08
See application file for complete search history.

(56) References Cited

FOREIGN PATENT DOCUMENTS

CA          2688838 A1 * 10/2008 ........... A01C 17/001

* cited by examiner

*Primary Examiner* — Christopher J. Novosad
(74) *Attorney, Agent, or Firm* — Thomas | Horstemeyer, LLP

(57) ABSTRACT

A system and method for regulating dispensation of seeds, fertilizer or other items. The system comprises a hopper, at least first and second movable metering plates, and an agitator assembly. Movement of the first and second movable metering plates in first and second directions, respectively, that are opposite one another increases a size of a plurality of output holes defined by interleaved portions of the metering plates, whereas movement of the first and second movable metering plates in the second and first directions, respectively, decreases the size of the output holes. An adjustable control handle can be moved to simultaneously move the first and second movable metering plates to adjust the size of the output holes. Each agitator remains in alignment with a center of a respective output hole regardless of a decrease or increase in the size of the output holes, resulting in more efficient dispensation.

14 Claims, 8 Drawing Sheets

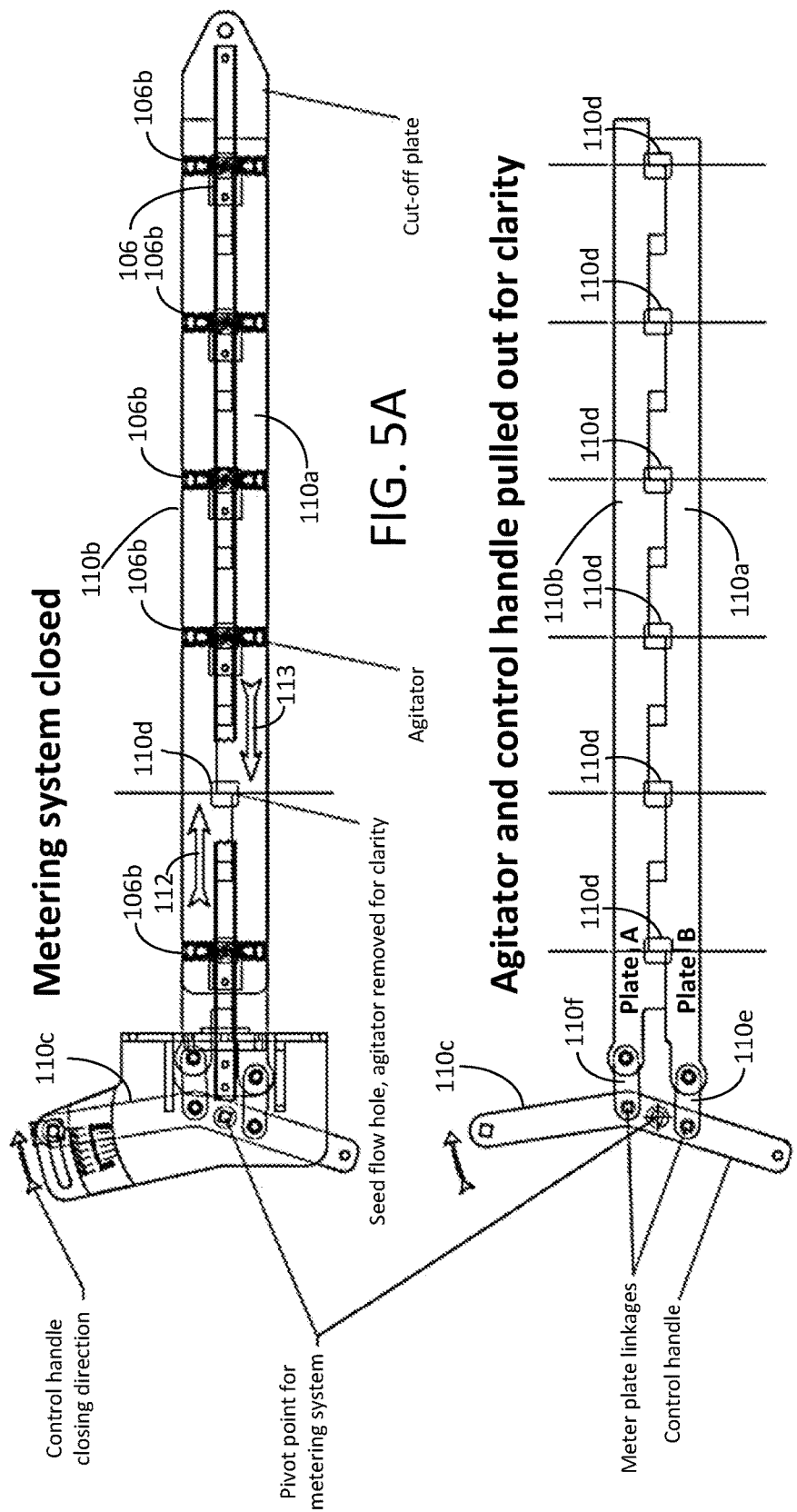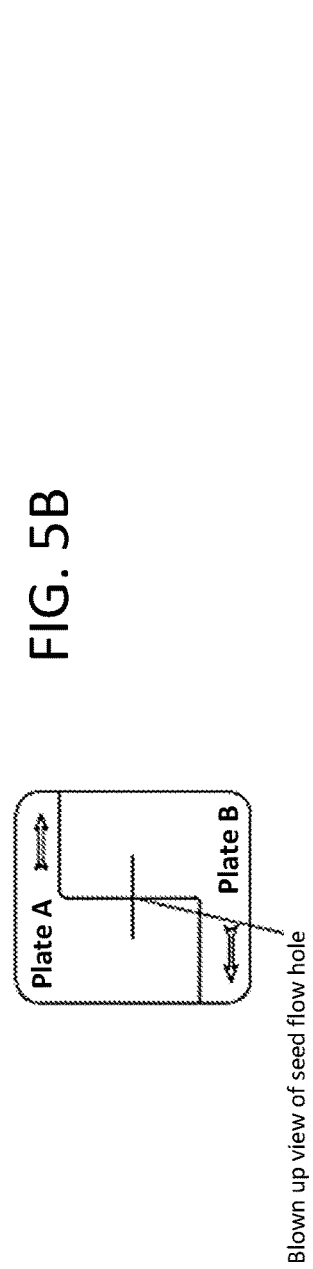

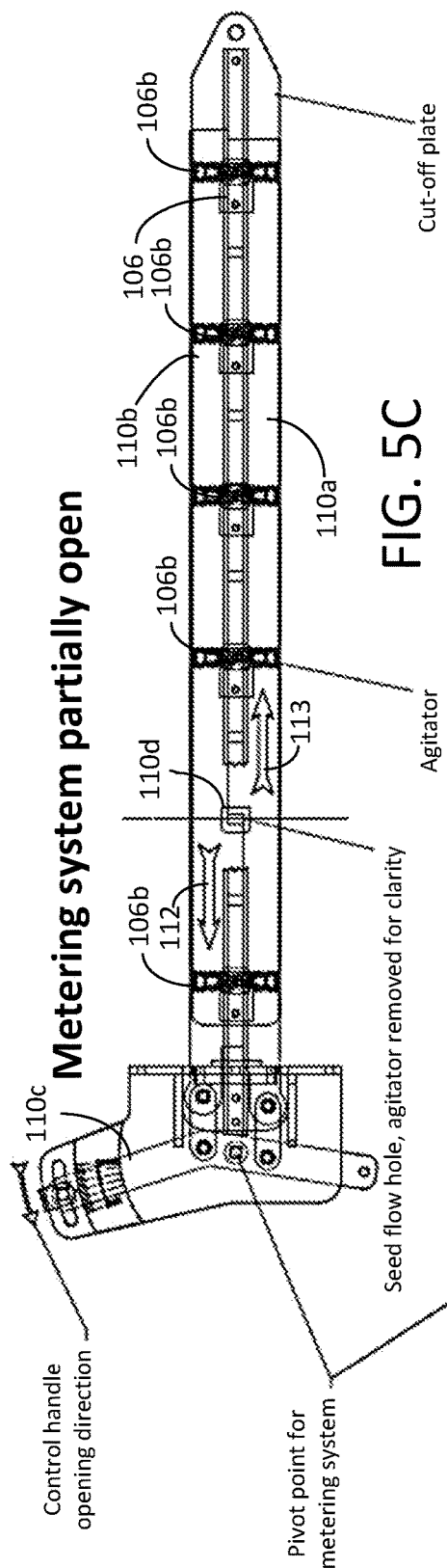
FIG. 5C
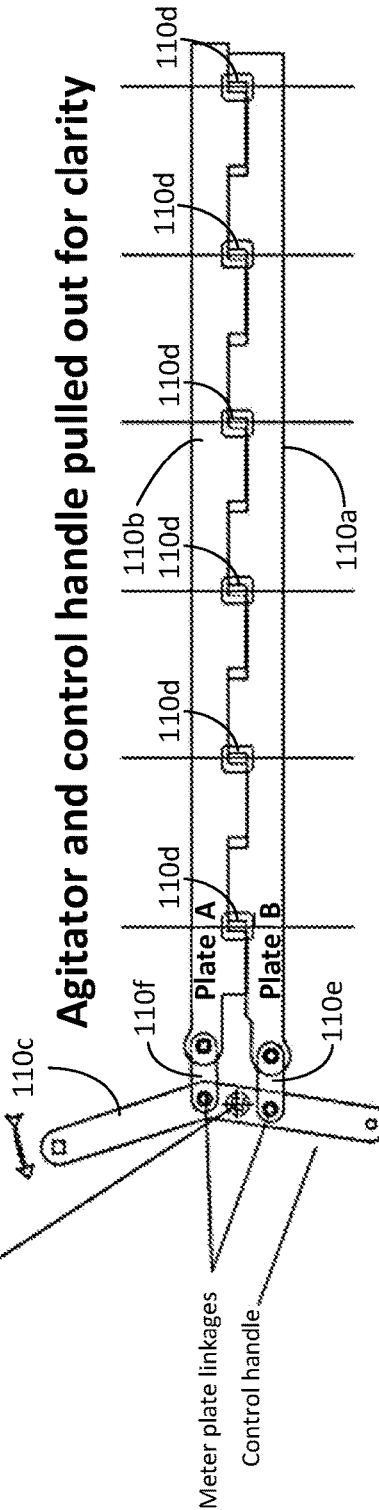
FIG. 5D
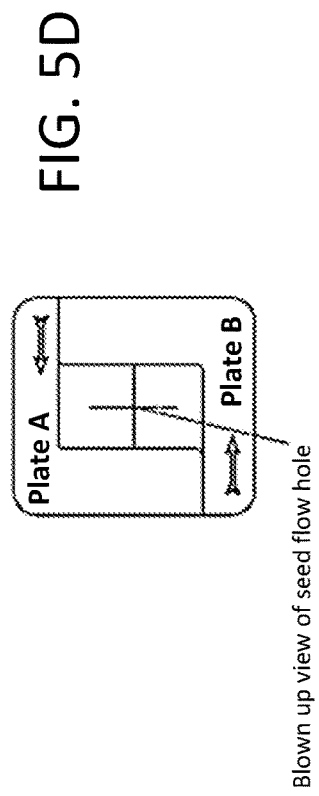

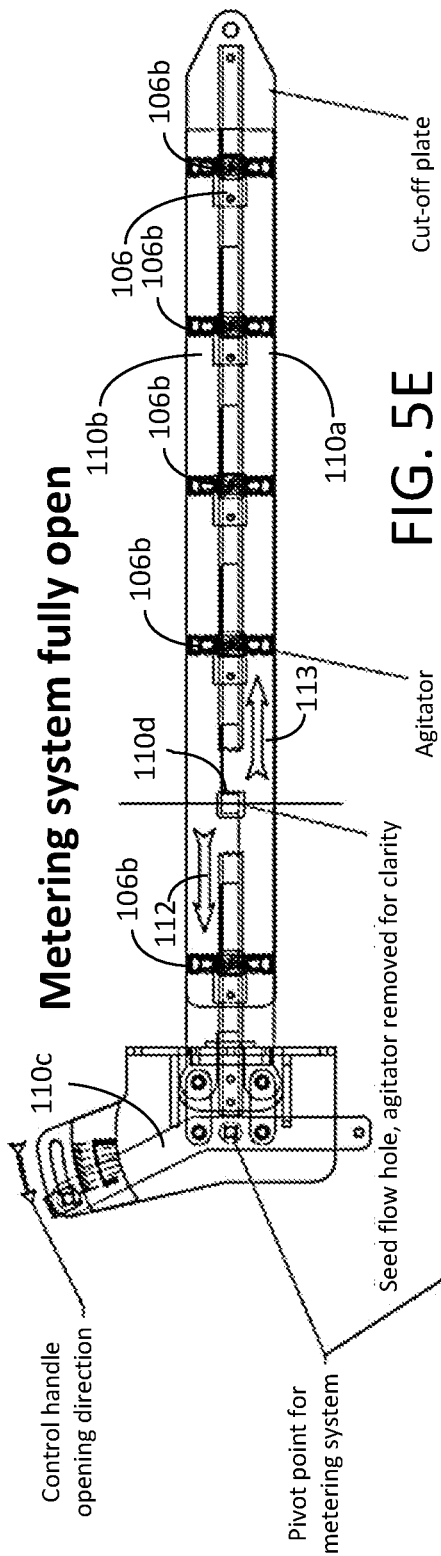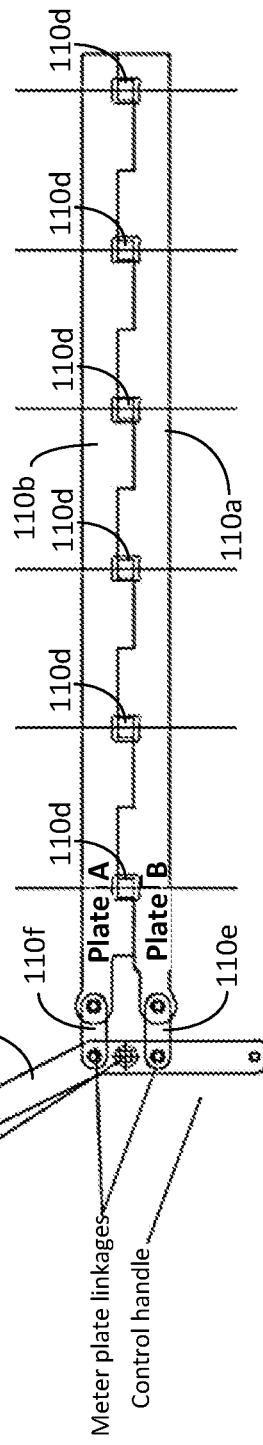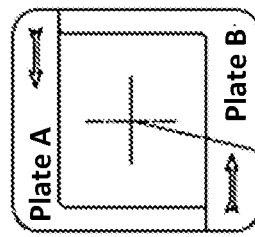

SYSTEM AND METHOD FOR REGULATING AND DISPENSING SEEDS, FERTILIZER, AND OTHER ITEMS

TECHNICAL FIELD

The present disclosure is directed to systems and methods for regulating and dispensing seeds, fertilizer and other items in a way that avoids bridging of materials.

BACKGROUND

In the agriculture and turf industries, various types of equipment are used to regulate and dispense seeds and other materials, such as fertilizer, for example, as the equipment is driven or pulled over the Earth's surface. One type of equipment is commonly referred to as a drop seeder. The drop seeder is cost effective to build and maintain and is designed to provide more consistent flow characteristics for a variety of seeds and seeding rates. Consistent flow rates lead to consistent plant stands. The end goal for seeding is to achieve consistent plant stands using a drop seeder that is cost effective to build and maintain.

In traditional drop seeders, a pair of metering plates is used to control the size of output holes through which the seeds are dispensed in order to accommodate seeds of different sizes. The metering plates are disposed at the bottom of a hopper into which the seeds are poured. An agitator assembly positioned above the metering plates operates to agitate the seeds as they accumulate on the metering plates to prevent bridging of the seeds over the holes. Bridging is a phenomenon that occurs when seeds disposed above the holes adhere to one another, which can prevent them from falling through the holes.

The agitator assembly comprises a series of rotating agitators, each being located generally above a respective one of the holes. The rotating agitators contact the seeds in proximity to the respective holes to prevent the seeds from bridging above the holes. The pair of metering plates includes a movable metering plate and a stationary metering plate. The metering plates have interleaved portions that are shaped such that lateral movement of the movable metering plate in a first direction relative to the stationary metering plate increases the size of the output holes, which are evenly spaced apart from one another. Lateral movement of the movable metering plate in a second direction opposite the first direction decreases the size of the output holes. To adjust the size of the output holes, the movable metering plate is adjusted in the first or second directions until the hole size is set appropriately for a particular seed size or fertilizer pellet size at a desired application rate.

With traditional drop seeders, as the size of the output holes is increased, the center of the output holes moves farther away from the respective agitators, resulting in reduced agitator efficiency. The reduction in agitator efficiency increases the likelihood that seed bridging will occur, which reduces seed flow efficiency. Accordingly, a need exists for a system and method for employment in dispensing equipment that further reduces or eliminates the likelihood that material bridging will occur, thereby ensuring more consistent flow efficiency.

SUMMARY

A system and method are disclosed herein for use in dispensing equipment, such as drop seeders, for example, for regulating dispensation of items. The system comprises a hopper, at least first and second movable metering plates and an agitator assembly. The hopper is configured to hold items to be dispensed. The hopper has an inlet opening through which the items to be dispensed are received and an outlet opening through which items to be dispensed flow out of the hopper. The first and second movable metering plates are disposed adjacent the outlet opening of the hopper. The first and second movable metering plates have interleaved portions configured such that movement of the first and second movable metering plates in first and second directions, respectively, that are opposite one another increases the size of a plurality of output holes defined by the interleaved portions and such that movement of the first and second movable metering plates in the second and first directions, respectively, decreases the size of the output holes.

The method comprises:

placing items to be dispensed in a hopper;

moving first and second movable metering plates in first and second directions, respectively, that are opposite one another or moving first and second movable metering plates in the second and first directions, respectively, to increase or decrease a size of a plurality of output holes defined by interleaved portions of the first and second movable metering plates; and rotating a plurality of agitators of an agitator assembly disposed above the first and second movable metering plates to agitate the items flowing out of the hopper, where each agitator is aligned with a center of a respective output hole and remains in alignment with the center of the respective output hole regardless of a decrease or an increase in the size of the output holes.

These and other features and advantages will become apparent from the following description, drawings and claims.

BRIEF DESCRIPTION OF THE DRAWINGS

FIGS. 5A and 5B are top views of the metering plates with and without the agitator assembly, respectively, where the control handle has been moved, thereby causing the metering plates to be moved to close the output holes.

FIGS. 5C and 5D are top views of the metering plates with and without the agitator assembly, respectively, where the control handle has been moved, causing the metering plates to be moved to partially open the output holes.

FIGS. 5E and 5F are top views of the metering plates with and without the agitator assembly, respectively, where the control handle has been moved, causing the metering plates to be moved to fully open the output holes.

DETAILED DESCRIPTION

Figure 1:
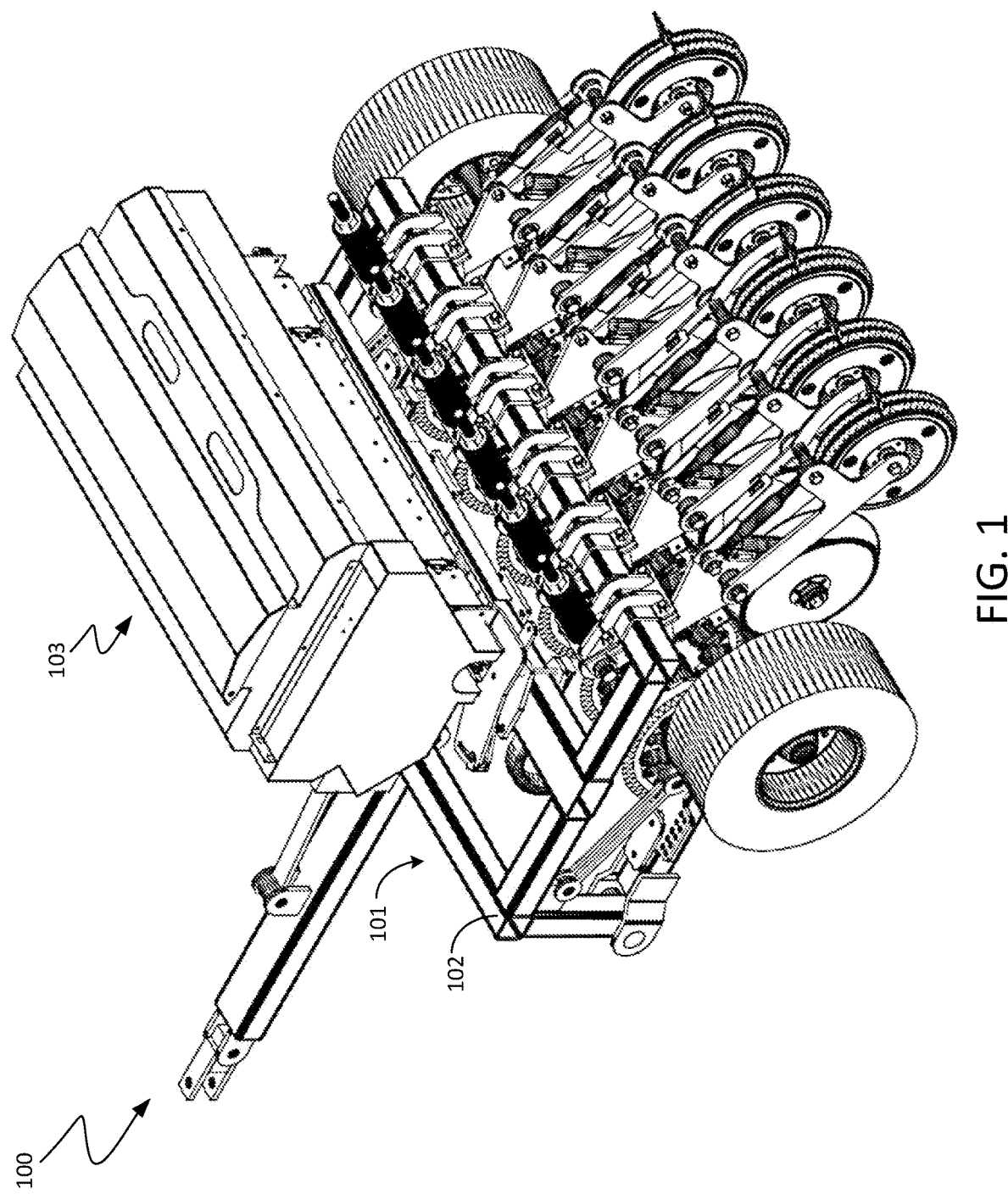
FIG. 1 is a perspective view of agricultural or turf seed dispensing equipment with which the system and method of the present disclosure may be used in accordance with a representative embodiment.

The present disclosure discloses a system and method for use in seed dispensing equipment for regulating dispensation of seeds, fertilizer or other items in a way that overcomes the aforementioned disadvantages of traditional drop seeders. The system comprises a hopper, at least first and second movable metering plates, and an agitator assembly. The hopper is configured to hold items to be dispensed and has an inlet opening through which the items to be dispensed are received and an outlet opening through which items to be dispensed pass out of the hopper. The first and second movable metering plates are disposed adjacent the outlet opening of the hopper and have interleaved portions. The plates are configured such that movement of the first and second movable metering plates in first and second directions, respectively, that are opposite one another increases a size of a plurality of output holes defined by the interleaved portions and such that movement of the first and second movable metering plates in the second and first directions, respectively, decreases the size of the output holes.

The agitator assembly is disposed above the first and second movable metering plates and comprises an axle and a plurality agitators. The axle is mechanically coupled with a drive system that rotates the axle to cause the agitators to rotate. Each agitator is aligned with a center of a respective output hole and remaining in alignment with the center of the respective output hole regardless of a decrease or increase in the size of the output holes.

In accordance with a preferred embodiment, a control handle that is manually adjustable or machine-adjustable is mechanically coupled to the first and second metering plates. Movement of the control handle in one direction simultaneously moves the first and second movable metering plates in the first and second directions, respectively, and movement of the control handle in another direction simultaneously moves the first and second movable metering plates in the second and first directions, respectively. The control handle is configured to be set in a plurality of positions to set the size of the output holes.

By ensuring that the agitators remain in alignment with the respective output holes regardless of the size of the output holes, the system and method reduce or eliminate the likelihood that seed bridging will occur, thereby ensuring more consistent seed flow efficiency.

In the following detailed description, for purposes of explanation and not limitation, exemplary, or representative, embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "mechanically coupled to" another element, it can be directly connected or coupled, or intervening elements may be present.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

FIG. 1 is a perspective view of agricultural or turf seed dispensing equipment 100 with which the system and method of the present disclosure may be used in accordance with a representative embodiment. It should be noted that the system and method of the present disclosure are not limited to being used with any particular type of dispensing equipment. The dispensing equipment 100 is shown as an example of equipment with which the system and method of the present disclosure may be used and is shown to demonstrate an example of the manner in which the system and method may be employed. The dispensing equipment 100 may be any type of equipment that is configured to be dispense seeds, fertilizer pellets or similar items that are generally of a particular size or approximate size and that are intended to be dispensed or distributed. For ease of discussion, the material or items to be dispensed is referred to hereinafter as "items," which may be seeds, fertilizer pellets or other items. It should be noted, however, that the system and method may be used in other applications, such as in industrial and pharmaceutical applications, for example, to dispense items or materials.

The dispensing equipment 100 shown in FIG. 1 is configured to be pulled by a vehicle (not shown) during dispensing operations, but the system and method of the present disclosure may be employed with self-propelled dispensing equipment, i.e., dispensing equipment that is designed to be driven by an operator rather than pulled. The dispensing equipment 100 includes a carriage assembly 101 that includes a frame 102 on which a hopper 103 is mounted.

Figure 2A:
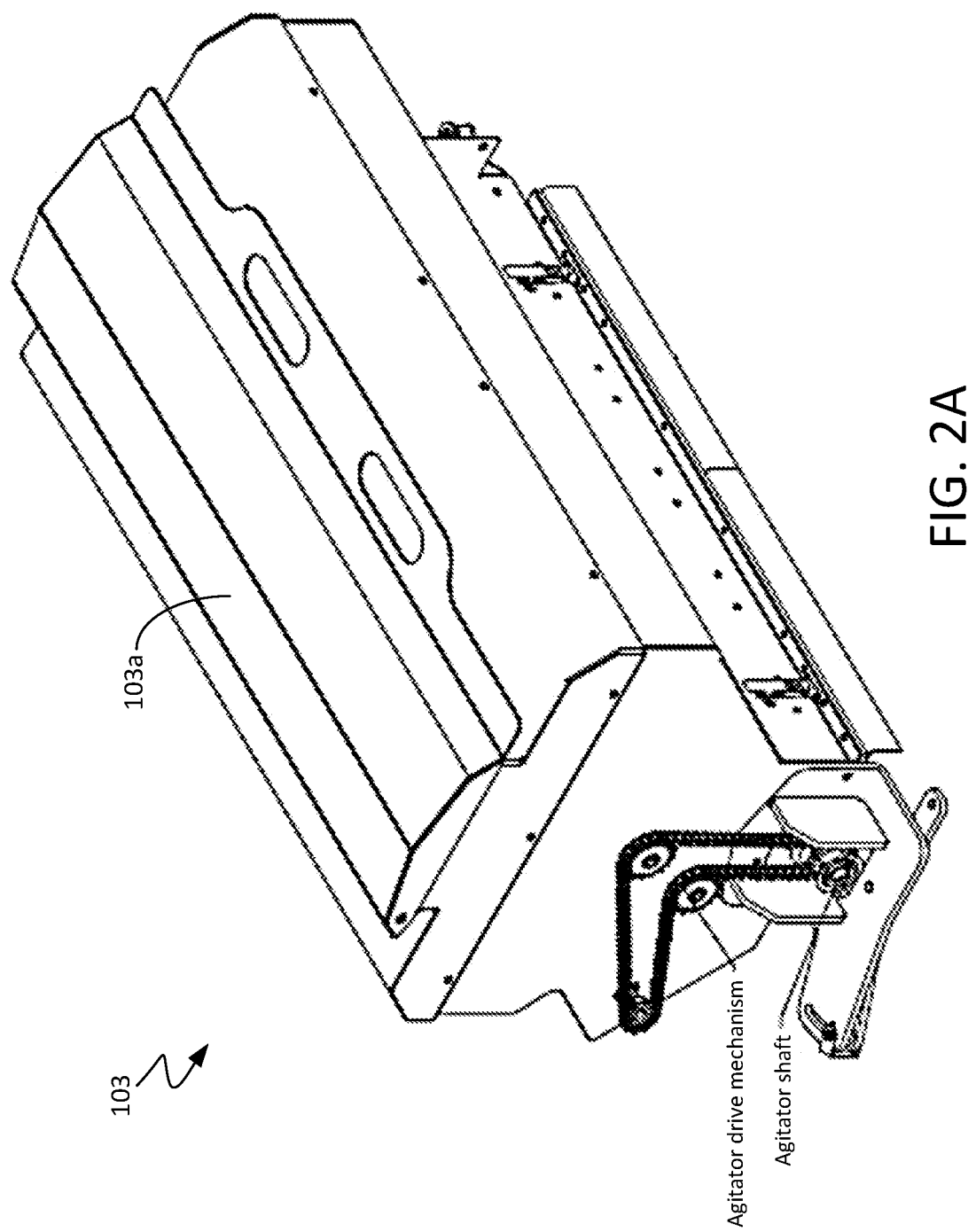
FIGS. 2A and 2B are, respectively, side perspective and top perspective views of the hopper shown in FIG. 1 with and without the hopper door, respectively.
Figure 2B:
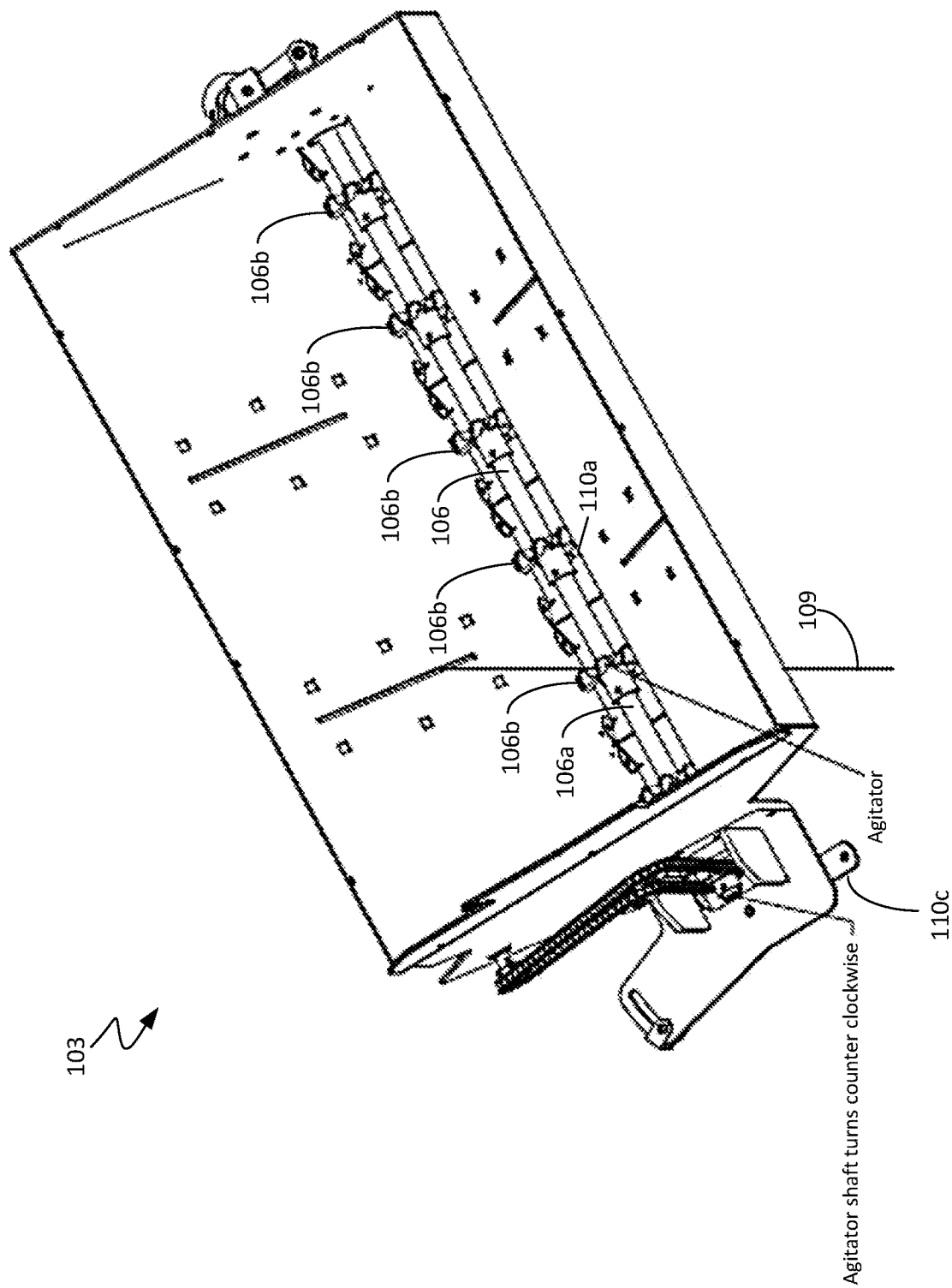

FIGS. 2A and 2B are, respectively, side perspective and top perspective views of the hopper 103 shown in FIG. 1 with and without the hopper door 103a, respectively. With the hopper door 103a removed in FIG. 2B, the agitator assembly 106 and the first and second movable metering plates 110a and 110b, respectively, are visible.

Figure 3:
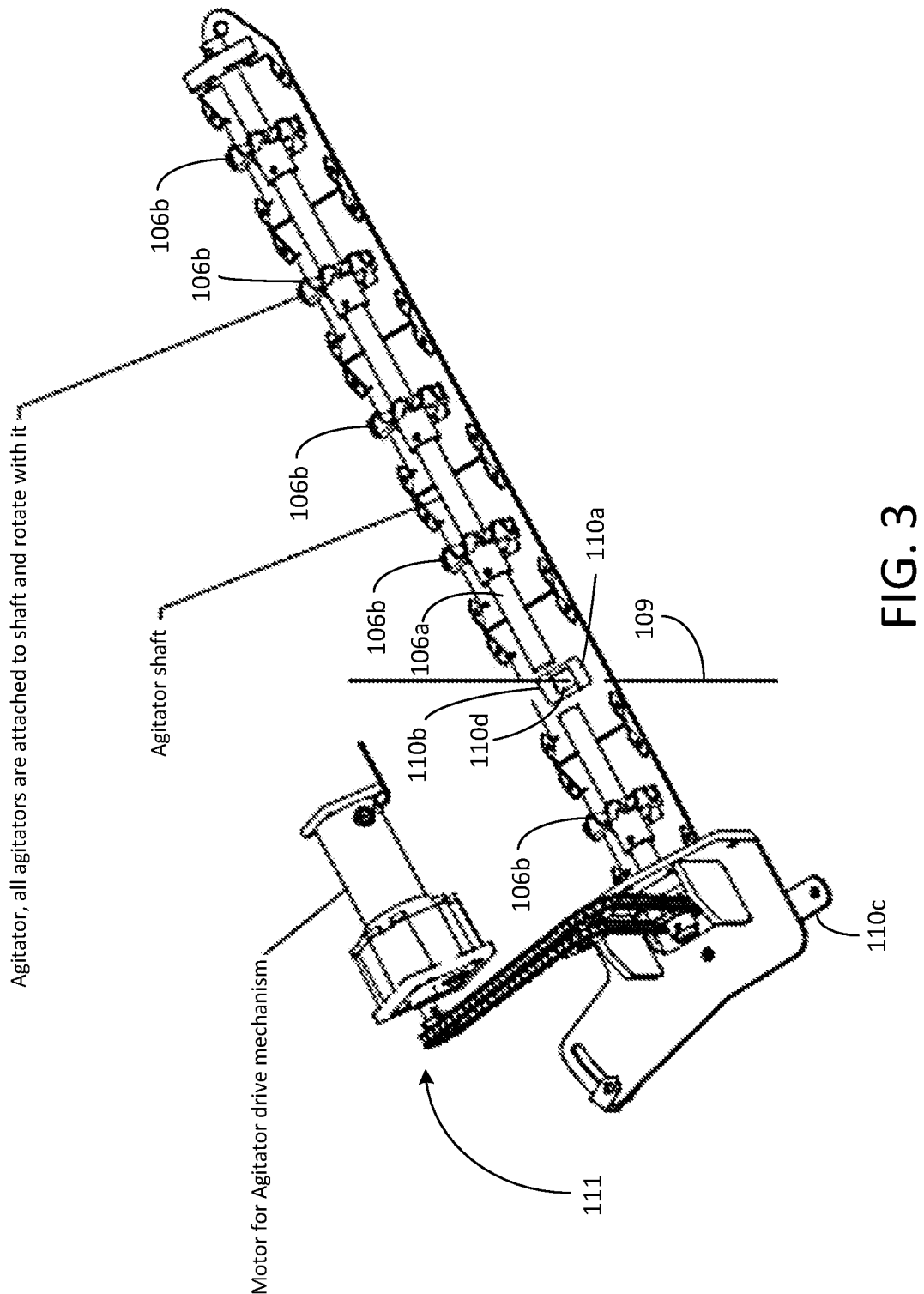
FIG. 3 shows a top perspective view of the agitator assembly, the first and second movable metering plates, and a drive system that is mechanically coupled to an axle of the agitator assembly for rotating the axle in accordance with a representative embodiment.

FIG. 3 shows a top perspective view of the agitator assembly 106, the first and second movable metering plates 110a and 110b, respectively, and a drive system 111 that is mechanically coupled to an axle 106a of the agitator assembly 106 for rotating the axle 106a. A plurality of agitators 106b are secured to the axle 106a such that rotation of the axle 106a via the drive system 111 imparts rotational motion to the agitators 106b. FIG. 3 also shows a control handle 110c that is mechanically coupled to the first and second movable metering plates 110a and 110b, respectively, in accordance with the preferred embodiment. The control handle 110c can be moved and locked, or set, in one of a plurality of positions to set the size of the output holes 110d defined by interleaved portions of the first and second movable metering plates 110a and 110b, respectively, to one of a plurality of sizes.

Figure 4:
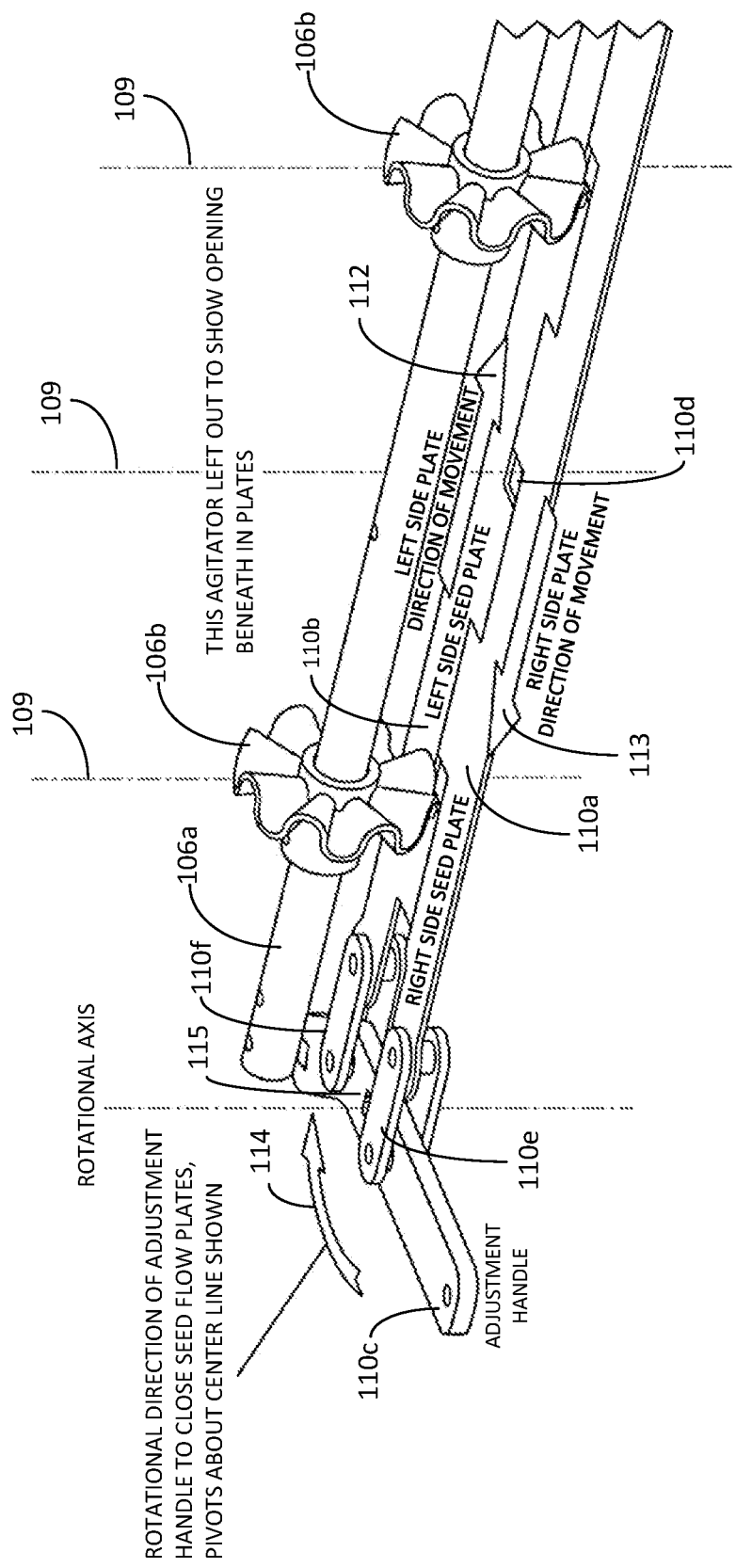
FIG. 4 shows a perspective view of the agitator assembly, the first and second movable metering plates, and the control handle of the system in accordance with a representative embodiment.

FIG. 4 shows a perspective view of the agitator assembly 106, the first and second movable metering plates 110a and 110b, respectively, and the control handle 110c. In FIG. 4, the drive system 111 has been removed. The control handle 110c is pivotally coupled by first and second linkages 110e and 110f to the first and second movable metering plates 110a and 110b, respectively. Arrows 112 and 113 represent first and second directions that are opposite one another. Movement of the control handle 110c in one direction indicated by arrow 114, simultaneously moves the first and second movable metering plates in the first and second directions 112 and 113, respectively. Movement of the control handle 110c in another direction opposite the direction indicated by arrow 114 simultaneously moves the first and second movable metering plates in the second and first directions 113 and 112, respectively. The control handle 110c pivots about a pivot point 115 and can be set in a plurality of positions to set the size of the output holes 110d.

Each agitator 106b is aligned with a center of a respective output hole 110d and remains in alignment with the center of the respective output hole 110d regardless of a decrease or increase in the size of the output holes 110d. The centers of the output holes 110d are represented by the centerline axes 109. As the control handle 110c is moved to adjust the size of the output holes 110d, the agitators 106b remain in alignment with the centers 109 of the respective output holes 110d due to the fact that the movable metering plates 110a and 110b are simultaneously moved in equal, but opposite, directions. This ensures that the agitators 106b will disrupt any bridging of the items being dispensed, which ensures efficient flow of the items being dispensed.

FIGS. 5A and 5B are top views of the metering plates 110a and 110b with and without the agitator assembly 106, respectively. In FIGS. 5A and 5B, the control handle 110c has been moved in the direction indicated by the arrow, thereby causing the metering plates 110a and 110b to be moved in the directions indicated by arrows 112 and 113 to close the output holes 110d. FIGS. 5C and 5D are top views of the metering plates 110a and 110b with and without the agitator assembly 106, respectively. In FIGS. 5C and 5D, the control handle 110c has been moved in the direction indicated by the arrow, causing the metering plates 110a and 110b to be moved in the directions indicated by arrows 112 and 113 to partially open the output holes 110d. FIGS. 5E and 5F are top views of the metering plates 110a and 110b with and without the agitator assembly 106, respectively. In FIGS. 5C and 5D, the control handle 110c has been moved in the direction indicated by the arrow, causing the metering plates 110a and 110b to be moved in the directions indicated by arrows 112 and 113 to fully open the output holes 110d. Because the plates 110a and 110b are always moved in equal, but opposite, directions by the control handle 110c, the centers of the output holes 110d remain aligned with the agitators 106 over the entire range of motion of the control handle 110c.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. For example, the number and the configurations of the metering plates can be different from what is shown herein. In addition, a variety of control handle configurations may be used, and the functions of the control handle may be automated if desired. Other variations to the disclosed embodiments can be understood and effected by those skilled in the art, from a study of the drawings, the disclosure, and the appended claims.

What is claimed is:

1. A system for use in dispensing equipment for regulating dispensation of items, the system comprising:
    a hopper configured to hold items to be dispensed, the hopper having an inlet opening through which the items to be dispensed are received and an outlet opening through which the items to be dispensed pass out of the hopper;
    at least first and second movable metering plates disposed adjacent the outlet opening of the hopper, the first and second movable metering plates having interleaved portions and being configured such that movement of the first and second movable metering plates in first and second directions, respectively, that are opposite one another increases a size of a plurality of output holes defined by the interleaved portions and such that movement of the first and second movable metering plates in the second and first directions, respectively, decreases the size of the plurality of output holes; and
    an agitator assembly disposed above the first and second movable metering plates, the agitator assembly comprising an axle and a plurality of agitators, the axle being mechanically coupled with a drive system that rotates the axle to cause the plurality of agitators to rotate, each agitator being aligned with a center of a respective output hole and remaining in alignment with the center of the respective output hole regardless of a decrease or increase in the size of the plurality of output holes.

2. The system of claim 1, further comprising:
    a control handle mechanically coupled to the first and second metering plates such that movement of the control handle in one direction simultaneously moves the first and second movable metering plates in the first and second directions, respectively, and movement of the control handle in another direction simultaneously moves the first and second movable metering plates in the second and first directions, respectively, the control handle being configured to be set in a plurality of positions to set the size of the plurality of output holes.

3. The system of claim 2, wherein the control handle is manually adjustable to allow a user to manually set the control handle in one of said plurality of positions to set the size of the plurality of output holes to one of a plurality of sizes.

4. The system of claim 2, wherein the control handle is adjustable by a machine to allow the machine to set the control handle in one of said plurality of positions to set the size of the plurality of output holes to one of a plurality of sizes.

5. The system of claim 1, wherein the items to be dispensed are seeds.

6. The system of claim 1, wherein the items to be dispensed are fertilizer pellets.

7. The system of claim 1, further comprising first and second linkages that pivotally couple the control handle to the first and second movable metering plates, respectively.

8. A method for use in dispensing equipment for regulating dispensation of items, the method comprising:
placing items to be dispensed in a hopper, the hopper having an inlet opening through which the items to be dispensed are received and an outlet opening through which the items to be dispensed flow out of the hopper;
moving first and second movable metering plates in first and second directions, respectively, that are opposite one another or moving the first and second movable metering plates in the second and first directions, respectively, to increase or decrease a size of a plurality of output holes defined by interleaved portions of the first and second movable metering plates, the first and second movable metering plates being disposed adjacent the outlet opening of the hopper such that the items flowing out of the hopper are dispensed through the plurality of output holes; and
rotating a plurality of agitators of an agitator assembly disposed above the first and second movable metering plates to agitate the items flowing out of the hopper, each agitator being aligned with a center of a respective output hole and remaining in alignment with the center of the respective output hole regardless of the decrease or increase in the size of the plurality of output holes.

9. The method of claim 8, wherein the first and second movable metering plates are moved by moving a control handle to an operating position, the control handle being mechanically coupled to the first and second metering plates such that movement of the control handle in one direction simultaneously moves the first and second movable metering plates in the first and second directions, respectively, and such that movement of the control handle in another direction simultaneously moves the first and second movable metering plates in the second and first directions, respectively, the control handle being configured to be set in a plurality of positions to set the size of the plurality of output holes defined by the interleaved portions of the first and second movable metering plates.

10. The method of claim 9, wherein the control handle is manually adjustable to allow a user to manually set the control handle in one of said plurality of positions to set the size of the plurality of output holes to one of a plurality of sizes.

11. The method of claim 9, wherein the control handle is adjustable by a machine such that the machine sets the control handle in one of said plurality of positions to set the size of the plurality of output holes to one of a plurality of sizes.

12. The method of claim 9, wherein first and second linkages pivotally couple the control handle to the first and second movable metering plates, respectively.

13. The method of claim 8, wherein the items to be dispensed are seeds.

14. The method of claim 8, wherein the items to be dispensed are fertilizer pellets.

* * * * *